Patented Oct. 3, 1944

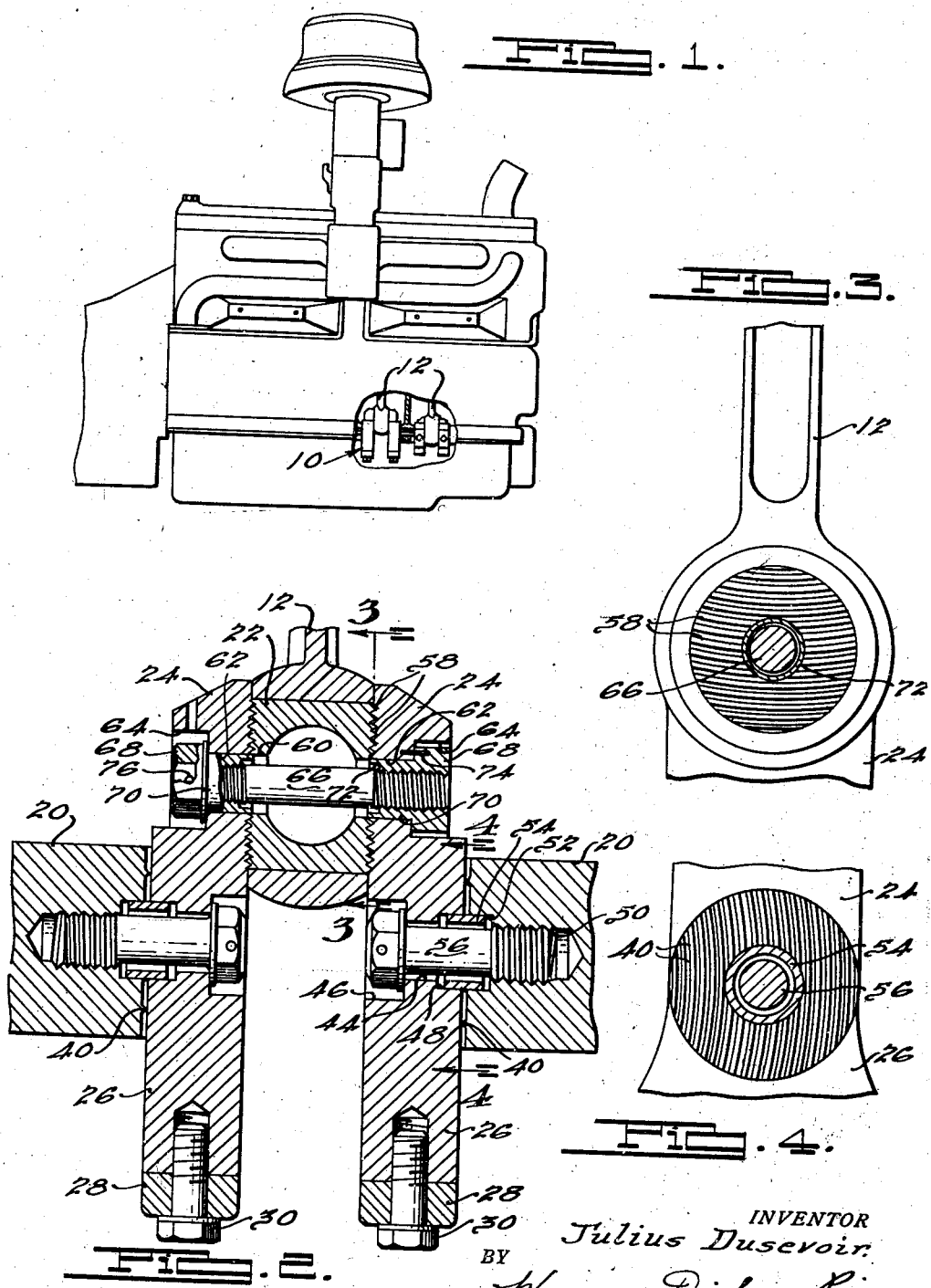

2,359,306

UNITED STATES PATENT OFFICE 2,359,306

ENGINE CRANKSHAFT

Julius Dusevoir, Dearborn, Mich., assignor to Century Motors Corporation, Dearborn, Mich., a corporation of Michigan Application December 24, 1941, Serial No. 424,267

9 Claims. (Cl. 74—598)

This invention relates to engine crankshafts of the type commonly employed in multi-cylinder internal combustion engines, the principal object being the provision of a crankshaft of the type described that is lighter in weight than conventional crankshafts, that is less subject to torsional and other vibrations than conventional crankshafts, and is relatively economical to build.

Objects of the invention include the provision of a multi-throw crankshaft in which the effects of torsional vibration are substantially eliminated; the provision of a multi-throw crankshaft having the characteristic of being more resistive to the transmission of vibratory forces therethrough than crankshafts of conventional construction; the provision of a crankshaft of materially less weight than crankshafts of conventional constructions; the provision of a crankshaft having journal portions of one type of metal and throw portions of a different type of metal, whereby said journal portions serve to dampen torsional vibrations of the crankshaft which would occur if the crankshaft was formed entirely of said different type of metal and said throw portions serve to dampen torsional vibration of said crankshaft which would occur if the crankshaft was formed entirely of said one type of metal; the provision of a crankshaft having journal portions of ferrous metal and throw portions formed of a light metal such as aluminum or magnesium, or alloys thereof; and the provision of a crankshaft having separately formed journal portions of relatively hard steel removably secured to throw portions formed from light metal.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a partially broken side elevational view of an internal combustion engine containing a crankshaft constructed in accordance with the present invention;

Fig. 2 is an enlarged fragmentary sectional view taken axially through a portion of the crankshaft shown in the engine in Fig. 1;

Fig. 3 is a transverse sectional view taken on the line 3—3 of Fig. 2; and,

Fig. 4 is a fragmentary transverse sectional view taken on the line 4—4 of Fig. 2.

The problem of torsional vibration in the crankshafts of internal combustion engines is one which requires careful consideration on the part of the designers and manufacturers in order to overcome the disadvantageous effects thereof. These effects become apparent when the rate of engine impulses transmitted to the engine crankshaft synchronize with the natural period of torsional vibration of the crankshaft. Under such conditions the crankshaft is set into vibration at its natural rate and unless some means are provided which are effective to dampen out such vibrations breaking of the crankshaft and subsequent wrecking of the engine may occur. In fact the great majority of crankshaft breakages may be directly attributed to such uncontrolled vibrations. Additionally, when a crankshaft begins to torsionally vibrate it upsets the normal, smooth running of the engine and causes the engine as a whole to vibrate, thus subjecting other parts to undue stresses, and particularly when such engines are employed in connection with a motor vehicle such vibrations create an undesirable noise and the effects of the vibrations are undesirably transmitted to the occupants of the vehicle.

It is possible to eliminate the effects of torsional vibrations with conventional crankshaft constructions by making the crankshaft so large and heavy that its natural rate of torsional vibration is higher than the rate of vibration which may be transmitted to it from the impulses of the engine at the highest possible engine speed, but such arrangement is undesirable, both from the standpoint of expense and the addition of undesired weight to the engine and from the standpoint of requiring journals of such size as to produce undesirably high operating speeds of the surfaces thereof in contact with their associated bearings. For these reasons, it is necessary, and particularly where multi-cylinder internal combustion engines of the relatively high speed type are employed in conjunction with motor vehicles and boats, to equip the crankshaft thereof with a torsional vibration damper.

It has, of course, been the practice heretofore to construct engine crankshafts of the type described from cast iron, semi-steel or steel, the latter being the material almost universally employed. These materials are such that when made up into crankshafts of a size adapted for commercial use, because of the inherent resiliency and other characteristics of such material the crankshaft is bound to have a natural period of torsional vibration which will synchronize with the rate of vibratory influences to which it will be subjected to during operation of the engine and particularly at the higher speeds thereof.

I have found that the torsional vibration characteristics of an engine crankshaft of the type described may be substantially eliminated as far as practical considerations are concerned if various portions of the length of the crankshaft are separated from one another by portions formed from a metal having characteristics of resiliency materially different from the characteristics of resiliency of such various portions. For instance, if alternate portions of the crankshaft are made from a metal which would cause the crankshaft to naturally vibrate at one engine speed if it were entirely made from such metal, and the remaining portions are made from a different metal which would cause the crankshaft to naturally vibrate at a different engine speed if entirely made from such other metal, then it will be appreciated that a crankshaft made with successive portions formed from such different metals will not vibrate naturally at either of such engine speeds. Preferably one of the metals used for alternate portions is one of materially less resiliency than the metals commonly employed for multi-throw crankshafts for internal combustion engines and, therefore, having such a low rate of natural vibrations that it will result in an engine crankshaft having a natural rate of torsional vibration so low as to be substantially below that corresponding with the normal low operation speed of the engine. Such metals as lead, copper, zinc, or alloys of these metals do, of course, have the characteristics of such metal of low resiliency but in view of the fact that such metal must necessarily be able to transmit the required forces without undesirable deformation, the use of lead and zinc and similar metals will usually be undesirable and the use of copper or copper alloys will ordinarily be inadvisable from the standpoint of cost. Aluminum or magnesium, or alloys thereof have a sufficiently low degree of resiliency for this purpose, are amply strong and relatively cheap and, therefore, are the materials which are desirably employed. It will, therefore, be assumed in the following description that those portions of the crankshaft that are formed from a metal different from that commonly employed, are formed from a light metal such as aluminum or magnesium, or alloys thereof.

The journal portion of such crankshaft must, of course, be of a character capable of withstanding the wear commonly met with in practice and for this reason should ordinarily be formed from the same material as conventional crankshafts are formed from, although, as will hereinafter be more fully described, the present invention permits such journal portions to be formed in whole, or in part, from bronze or the like. This leaves the throw portions of the crankshafts as those portions which may be formed of such different materials and desirably from some light metal such as aluminum, magnesium, or alloys thereof. While it might be possible to form the journal portions of such crankshafts and place them in a mold and thereafter cast the aluminum throw portions thereabout to form an integral one-piece crankshaft, such procedure would ordinarily be impractical from a production standpoint, the practical method of constructing the crankshaft being to form the journal portions and the throw portions separately and thereafter secure them together into a unitary structure.

Under the above described conditions it will be appreciated that the journal portions of the crankshaft will usually be formed from steel or other ferrous material having the desired characteristics of hardness required for these portions (except where formed in whole or in part from bronze or the like), and the throws will be formed from a light metal such as aluminum or magnesium or alloys thereof, the various journal portions and the various throw portions being formed separately from one another and then secured together. Thus each adjacent pair of journal portions will be separated from one another but secured relative to one another by means of a light metal throw portion. Consequently there will be no portion of the crankshaft formed entirely of a ferrous material of sufficient length for itself to be materially effected by torsional vibrations set up therein and the intervening portions of light metal will effectively reduce the natural periods of torsional vibration of the crankshaft as a whole to such a low value that the effects thereof will be substantially eliminated during normal engine operation. Under such conditions the use of a torsional vibration damper as is now conventional practice may, if desired, be eliminated entirely, or it may be employed for whatever aid it may afford.

Referring now to the accompanying drawing and particularly to Fig. 1, an internal combustion engine of a conventional type is there illustrated and may be considered as being of the multi-cylinder type having, for instance, six or eight cylinders arranged in line and as being provided with a crankshaft indicated generally in Fig. 1 at 10, and associated connecting rods 12.

As illustrated in Fig. 2 the crankshaft 10 is provided with main journal portions 20 and connecting rod journal portions 22, these portions being cylindrical in character, and intervening throw portions 24. In accordance with the present invention the journal portions 20 and 22, except in the case hereinafter more fully explained, are formed from a ferrous metal such as steel, semi-steel or cast iron, and the throw portions 24 are formed from a light metal such as aluminum, magnesium, or alloys thereof. The throw portions 24 may be provided with conventional counterbalance extensions 26, if desired. The various journal portions 20 are formed separately from one another and from the various connecting rod journal portions 22 and from the throw portions 24 and after such separate formation are secured together into the unitary structure comprising the entire crankshaft for the engine.

In view of the fact that the throws 24 are formed from light metal as described it may be found desirable, particularly in some instances, to increase the effective weight of the counterbalance portions 26 of the throws 24 by securing counterweight members such as 28 to the radially outer extremities of the portions 26 as by screws 30. The counterweights 28 in such case will, of course, be formed from some relatively heavy metal such as steel or the like and together with the portions 26 will represent a sufficient mass to counterbalance the throws 24 on the opposite side of the center line of the crankshaft, the corresponding connecting rod journal 22 and a portion of the connecting rod 12 in accordance with conventional practice.

Instead of forming the connecting rod journal portions 22 from a ferrous metal, it may be desirable, under some circumstances, to form them from bronze or other material having characteristics suitable for forming a bearing surface in direct contact with the material of the connecting rods 12, then the connecting rods 12 do not require the application of a bearing to the big end thereof as in conventional constructions, but may bear directly on the journal portions 22. Otherwise such bearings are employed as will be readily appreciated and in such case the various journal portions may, if desired, be formed from a suitable grade of steel permitting hardening to an extent not possible in conventional constructions, with all of the attendant advantages.

The manner in which the main journal portions 20 are connected to the throw portions 24 and the throw portions 24 are connected to the connecting rod journal portions 22 is immaterial as far as the broad aspects of the present invention are concerned, but it is preferable that particularly the connecting rod journal portions 22 are removably secured to the throw portions 24 so that when it is desired to remove a piston from the engine the corresponding connecting rod journal portion 22 may be released from its cooperating throw portions 24 and the assembly of the piston, connecting rod and journal portion 22 removed as a unit. In any event the various separately formed parts should be secured together in an accurate manner so that the proper angular relationship between the various throw portions 24 and the connecting rod journal portions 22 about the axis of the crankshaft is established and so that these parts will be rigidly maintained in their intended position and the final shaft will be straight. Preferably these various parts are secured together in the manner shown and claimed in my copending application for Letters Patent of the United States for improvements in Crankshaft, filed July 31, 1941, and serially numbered 404,756. In accordance with the construction shown in said prior application the abutting faces are provided with interfitting curved serrations which permit assembly of cooperating parts in one position of rotation only and which assembly is maintained by suitable screw means. This is the construction shown in the drawing and is as follows:

The cooperating faces between each main journal portion 20 and its cooperating throw portion 24 are provided with a multiplicity of curved serrations as indicated in Fig. 4 which shows the serrated face of one of the throw portions 24, these serrations being indicated at 40 and as being struck from a common center outside of the periphery of that area of the throw portion 24 which is to receive the end of the cooperating main journal portion 20. These serrations are preferably of triangular cross-sectional configuration and the serrations on the cooperating end of the main journal portion 20 are formed from accurate interfitting engagement therewith. Accordingly, it will be appreciated that when the cooperating serrations on the main journal portion 20 and the throw portion 24 are interengaged with one another and the two portions are maintained against axial displacement, it is possible for one to be shifted laterally with respect to the other only in the direction of the length of the serrations and these being curved offer a material amount of resistance to shifting in such direction.

In order to maintain the main journal portions 20 and throw portions 24 against axial separation and to maintain them in the desired alignment with respect to each other, each throw portion as indicated in Fig. 2 is provided with an opening 44 therein which is enlarged as at 26 on that side thereof opposite the cooperating main journal portion 20 and is enlarged at that end next to the cooperating main journal portion 20 as indicated at 48. The cooperating end of the cooperating main journal portion 20 is provided with a threaded opening 50 disposed axially therein and the outer end of such opening is enlarged as at 52 to the same diameter as the enlarged end 48 of the opening 44 in the throw portion 24. A relatively thin annular sleeve 54 is received in the enlarged portions 48 and 52 of the openings 44 and 50, respectively, and in overlapping relationship with respect to the plane of junction between the main journal portion 20 and the throw portion 24. The sleeve 54 is of a size to be relatively closely received within the enlarged portions 48 and 52 but is of sufficient resiliency so as to be capable of a slight amount of lateral deformation to insure its reception in both portions 48 and 52 despite a small amount of possible eccentricity between the portions 20 and 24. The sleeve 54 thus locks the parts 20 and 24 against lateral displacement in the direction of the length of the serrations 40. A bolt 56 is inserted through the opening 44, through the sleeve 54 and threaded into the threaded opening 50 in the cooperating main journal portion 20, the head of the bolt being received within the enlarged portion 46 at the inner end of the opening 44 as shown. The bolt 56 thus serves to removably secure each throw portion 24 to its cooperating main journal portion 20 against axial separation therefrom.

Each end face of the connecting rod journal portions 22 and that area of the cooperating throw 24 against which it abuts is provided with a multiplicity of serrations 58 which, as illustrated in Fig. 3, are of substantially the same character as the serrations 40 previously described and which interfit with one another in the same manner and for the same purpose. Each connecting rod journal portion 22 is provided with a central opening 60 and the cooperating throw portions are provided with aligned openings 62 of the same diameter, and the openings 62 at their outer ends are enlarged as at 64. A stud 66 extends through the opening 60 in the journal portion 22 and its opposite ends lie within the opening 62 of the throw portions 24 where each such end receives a nut 68 thereon. Each nut 68 has an inwardly extending sleeve-like portion 70 which is closely received within the corresponding openings 62 and the inner ends of which project a short distance into the corresponding ends of the central opening 60 in the journal portion 22 so as to overlap the joint therebetween. Such overlapping end portions are internally cut away over the line of junction between the cooperating throw portion 24 and the journal portion 22 so as to provide a relatively thin and distortable sleeve 72 serving the same function as the sleeve 54 previously described. The enlarged end portions of the nut 68 are received within the corresponding recesses 64 so that their axially outer faces are flush with the corresponding faces of the throw portions 24. A pin 74 arranged in parallel relation with respect to the axis of the studs 66 is preferably provided and partially received both in one of the nuts 68 and its cooperating throw portion 24 so as to lock the corresponding nut against rotation, and an opening such as 76 is provided in the opposite nut 68 for reception of a locking wire to hold such nut against rotation in service.

From the above description it will be appreciated that the studs 66 and cooperating nuts 68 serve to hold each connecting rod journal portion 22 against axial separation with respect to its cooperating throw portions 24 and that the thin annular inner ends 72 of the two of the nuts 68 is being arranged in overlapping relation with respect to the line of junction between the portions 22 and 24 effectively lock these parts against lateral displacement in the direction of the length of the serrations 58 between them.

From the above it will be appreciated that in view of the fact that the throw portions 24 of the crankshaft are formed from aluminum, magnesium, or alloys thereof or equivalent light metals having a low natural rate of vibration, these light metal throw portions serve to separate the journal portions of the crankshaft by a material which is relatively vibration damping in character, and that as a result of this construction the crankshaft will have such a low natural rate of torsional vibration that its effect may be substantially disregarded in many, if not most cases. Further in view of the fact that such light metals are ordinarily a poor conductor of sound or other vibratory influences, the construction will serve to quiet the operating noises of the engine. Furthermore, in view of the fact that by forming the throw portions 24 of aluminum and the bulk of the crankshaft is composed of such throw portions, it will be appreciated that the weight of the crankshaft and consequently the weight of the engine itself may be materially reduced as compared to an equivalent engine having a crankshaft of conventional construction.

Having thus described my invention what I claim by Letters Patent is:

1. A metallic shaft capable of being subjected to rapidly repeated torsional stresses at points spaced along its length without causing substantial general torsional vibration of said shaft, said shaft having a plurality of alternate sections of different metals along its length, the alternate sections of said shaft being of such metals and shapes that they have sufficiently different natural frequencies of torsional vibration to prevent substantial general torsional vibration of said shaft.

2. A crank shaft for a multi-cylinder engine which is substantially free of general torsional vibration during operation of said engine, said shaft having a plurality of alternate sections of different metals along its length, the alternate sections being of such metals and shapes that they have sufficiently different natural frequencies of torsional vibration to prevent substantial general torsional vibration of said shaft.

3. A crank shaft for a multi-cylinder engine which is substantially free of general torsional vibration during operation of said engine, said shaft having a plurality of alternate sections of different metals along its length, the alternate sections being of such metals and shapes that they have sufficiently different natural frequencies of torsional vibration to prevent substantial general torsional vibration of said shaft, alternate ones of said sections being of one metal and the other alternate sections being of a metal which is relatively light with respect to said one metal.

4. A crank shaft for a multi-cylinder engine which is substantially free of general torsional vibration during operation of said engine, said shaft having a plurality of alternate sections of different metals along its length, the alternate sections being of such metals and shapes that they have sufficiently different natural frequencies of torsional vibration to prevent substantial general torsional vibration of said shaft, alternate ones of said sections comprising the journals of said crank shaft and being of one metal and the other alternate sections comprising the throws of said crank shaft and being of a metal which is relatively light with respect to said one metal.

5. A crank shaft for a multi-cylinder engine which is substantially free of general torsional vibration during operation of said engine, said shaft having a plurality of alternate sections of different metals along its length, the alternate sections being of such metals and shapes that they have sufficiently different natural frequencies of torsional vibration to prevent substantial general torsional vibration of said shaft, alternate ones of said sections comprising journals of said crank shaft and being of ferrous metal and the other alternate sections comprising the throws of said crank shaft and being essentially aluminum.

6. A crank shaft for a multi-cylinder engine which is substantially free of general torsional vibration during operation of said engine, said shaft having a plurality of alternate sections of different metals along its length, the alternate sections being of such metals and shapes that they have sufficiently different natural frequencies of torsional vibration to prevent substantial general torsional vibration of said shaft, alternate ones of said sections comprising the journals of said crank shaft and being of bronze, the other alternate sections comprising the throws of said crank shaft and being of a different metal.

7. A crank shaft for a multi-cylinder engine which is substantially free of general torsional vibration during operation of said engine, said shaft having a plurality of alternate sections of different metals along its length, the alternate sections being of such metals and shapes that they have sufficiently different natural frequencies of torsional vibration to prevent substantial general torsional vibration of said shaft, alternate ones of said sections comprising the journals of said crank shaft and being of bronze, the other alternate sections comprising the throws of said crank shaft and being essentially aluminum.

8. A crank shaft for a multi-cylinder engine which is substantially free of general torsional vibration during operation of said engine, said shaft having a plurality of alternate sections of different metals along its length, the alternate sections being of such metals and shapes that they have sufficiently different natural frequencies of torsional vibration to prevent substantial general torsional vibration of said shaft, alternate ones of said sections comprising the journals of said crank shaft and being of bronze, the other alternate sections comprising the throws of said crank shaft and being of a ferrous metal.

9. A crank shaft for a multi-cylinder engine which is substantially free of general torsional vibration during operation of said engine, said shaft having a plurality of alternate sections of different metals along its length, the alternate sections being of such metals and shapes that they have sufficiently different natural frequencies of torsional vibration to prevent substantial general torsional vibration of said shaft, said alternate sections being releasedly secured to each other.

JULIUS DUSEVOIR.